United States Patent [19]

Lannen

[11] 3,935,748
[45] Feb. 3, 1976

[54] UNIVERSALLY TILTABLE BALANCING MACHINE FOR INFLATED PNEUMATIC TIRES

[75] Inventor: Robert J. Lannen, Wixom, Mich.
[73] Assignee: Micropoise Engineering Company, Wixom, Mich.
[22] Filed: Feb. 4, 1974
[21] Appl. No.: 439,526

[52] U.S. Cl. .................................. 73/484; 73/485
[51] Int. Cl.² ...................... G01M 1/04; G01M 1/12
[58] Field of Search ......... 73/483, 484, 485; 156/75

[56] References Cited
UNITED STATES PATENTS

| | | | |
|---|---|---|---|
| 3,203,255 | 8/1965 | Rexroat | 73/484 |
| 3,229,528 | 1/1966 | Hemmeter | 73/484 |
| 3,352,732 | 11/1967 | Darr | 73/485 |
| 3,361,177 | 1/1968 | Fawick | 301/11 R X |
| 3,529,869 | 9/1970 | Casey | 301/11 R |

*Primary Examiner*—Jame J. Gill
*Attorney, Agent, or Firm*—Merrill N. Johnson; Allan J. Murray

[57] ABSTRACT

A carrier for inflatable pneumatic tires is supported for tilting travel about a substantially vertical axis upon an arcuately spherical universal pivot resting upon a seat having a corresponding sphericity. The seat surmounts a pedestal, and the pedestal and carrier are jointly formed with an air conducting means, the continuity of which is interruptible, to admit air to and from a tire mounted for balancing upon the carrier, to inflate and deflate such tire. The pedestal surmounts a fluid motor provided with two pistons in tandem: one piston carries an actuating rod to operate a valve to admit air to a tire prior to balancing, and to resist escape of air from an inflated tire on the carrier during balancing. The carrier is equipped with a lower rim element to engage a lower bead of a tire and an upper rim element to engage an upper bead of a tire. The upper rim element is removable. A carriage means is provided having travel to advance the upper rim element for deposit upon the carrier to retain a tire thereon, and alternatively, to remove and retract the upper rim element from the carrier to afford loading and unloading of a tire upon the carrier. The fluid motor rests on the upper surface of a housing, which housing also supports a frame or superstructure from which said carriage means is dependent.

79 Claims, 15 Drawing Figures

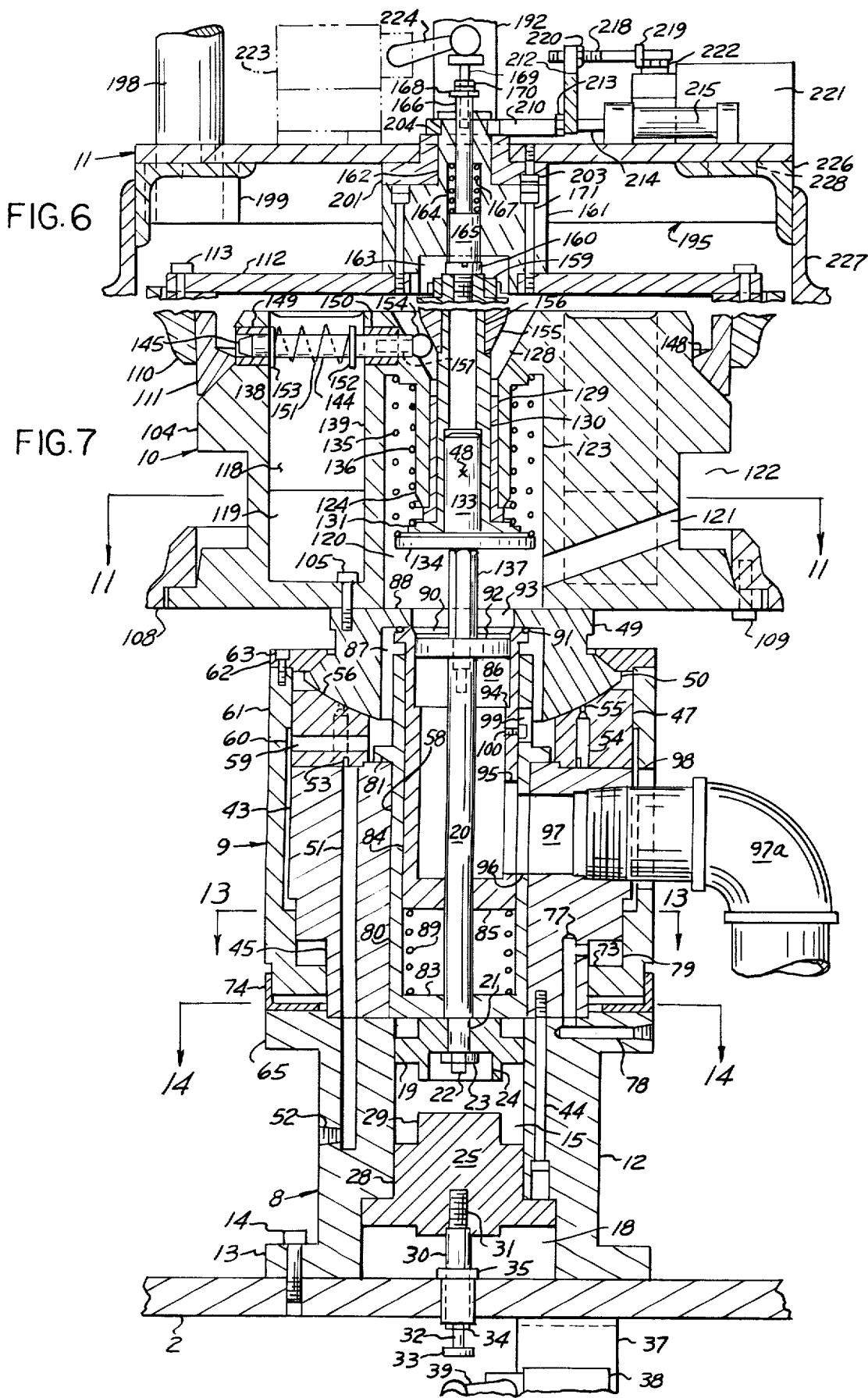

UNIVERSALLY TILTABLE BALANCING MACHINE FOR INFLATED PNEUMATIC TIRES

RELATED APPLICATIONS

There are no related applications known to or filed by applicant on the invention disclosed herein.

BACKGROUND OF INVENTION

This invention lies in the field of machines for static determination of imbalance in annular objects, and specifically in inflatable, pneumatic tires. It is proposed to balance uncured, or "green" tires by mounting them singly upon a carrier, inflating them, and balancing them to determine the amount and radial angle of any imbalance therein, and deflating them prior to removal from the machine.

PRIOR ART

The pivotal means of the ensuing disclosure is closely analagous to the disclosure of U.S. Pat. No. 3,181,371, issued on May 4, 1965, to Joseph P. Lannen, on a Universal Balance Testing Machine, and showing therein means to lubricate such pivot with oil under pressure. Said patent does not deal with the problems attendant upon balancing only inflated tires (not mounted upon wheels).

A damper, as disclosed in U.S. Pat. No. 2,349,288, issued on May 23, 1944, to Joseph P. Lannen, may be employed with the present disclosure if desired.

SUMMARY OF THE INVENTION

Invention lies in the provision, in the hereinafter described machine, of a carrier to removably receive a pneumatic tire for fluid sealed retention, and in the provision of air conducting means having interruptible continuity for inflation or deflation of a tire, with balancing means for said tire.

An object of the invention is to provide means to establish said continuity for inflation and deflation of a tire, and to provide means to interrupt said continuity, during tilting travel of the carrier.

A further object of the invention is to provide a valve in the carrier to resist escape of air from an inflated tire when said continuity is interrupted.

Still a further object of the invention is to provide in said carrier an upper rim element removable from said carrier to afford loading and unloading of a tire, and applicable upon said carrier for air-sealed retention of a tire, and to provide locking mechanism in said carrier to releasably lock said upper rim element in said tire-retaining position during inflation and balancing.

A further object of the invention is to provide a fluid motor disposed beneath and supporting said seating member and said carrier, and to equip said motor with an actuating rod extending into said air conducting means, and in so juxtaposing said carrier, said seating member, and said fluid motor, that said actuating rod serves (1) to open said valve, and allow it to close, (2) to lock and release said locking mechanism for said upper rim element, and (3) to afford continuity of said air conducting means, or to effect interruption of said continuity.

These and various other objects are attained by the invention hereinafter described and illustrated in the accompanying drawings, wherein:

FIG. 6 is a vertical, partial, sectional view on line 6—6 of FIG. 3, but on a slightly smaller scale, showing the upper rim carriage and a portion of the upper rim element as carried by said carriage.

FIG. 7 is a partial, vertical, sectional view taken on line 7—7 of FIG. 10, but otherwise being a downward continuation of FIG. 6.

Figure 1:
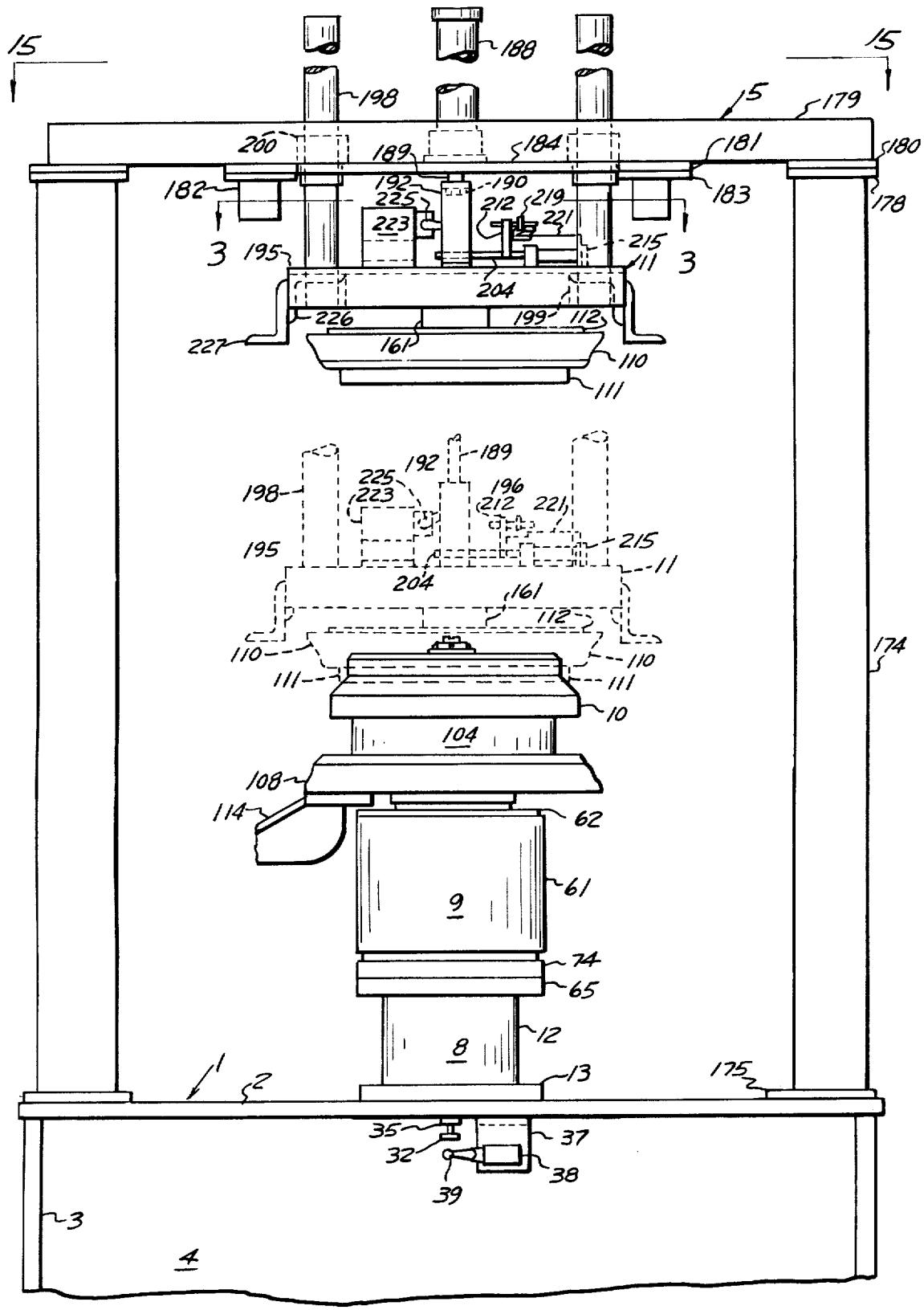
FIG. 1 is a front, elevational view, with the carriage up and carrying said upper rim element; the carriage is also shown in dash line in position to deposit the upper rim upon the tire carrier.
Figure 2:
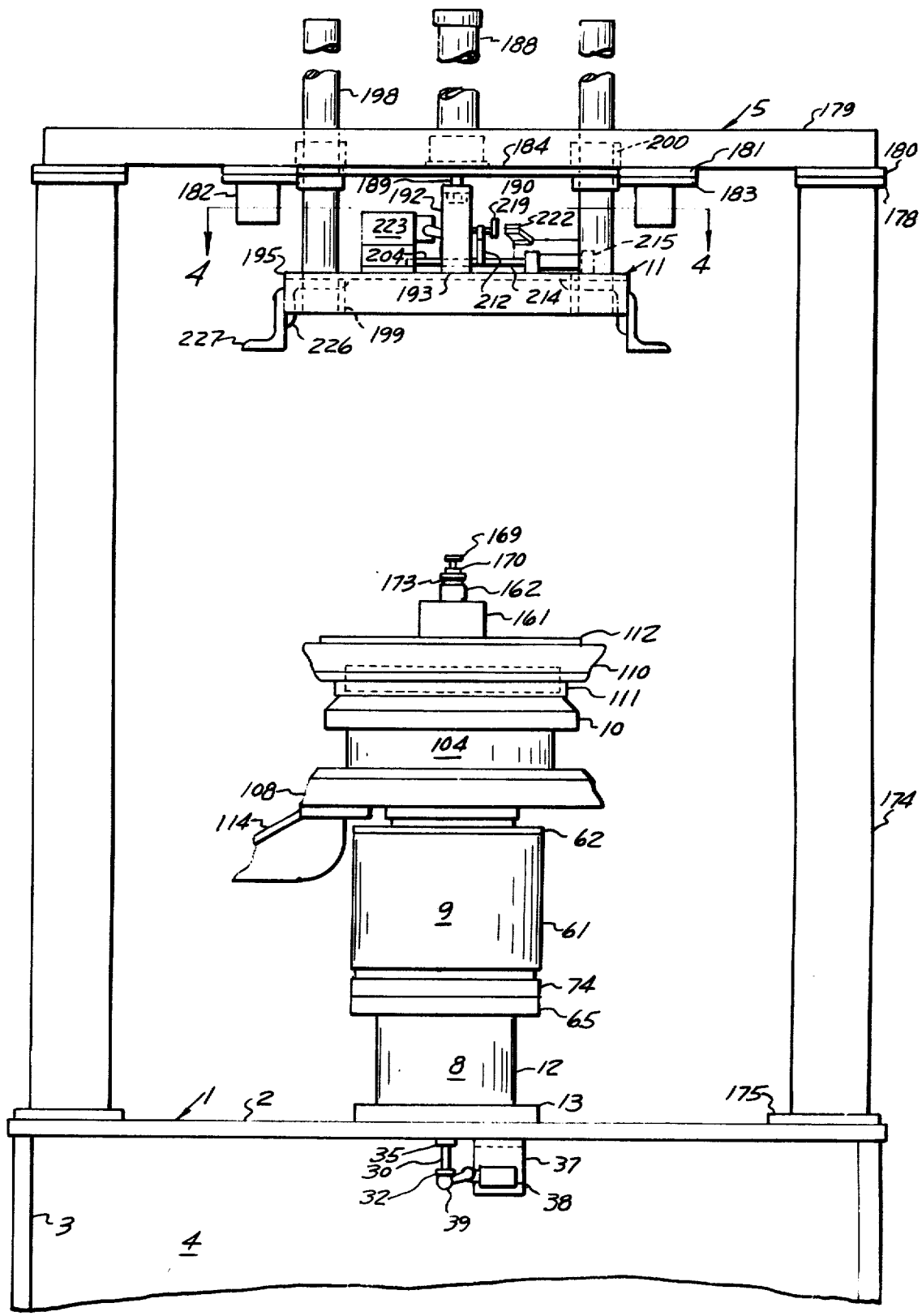
FIG. 2 is similar to FIG. 1, with the carriage in the up position and the upper rim deposited upon said tire carrier.

In said views, the reference character 1 designates a housing or base having a top wall 2 supported in part by side walls 3, and a back wall 4. A front wall with an access door (not shown) may also be provided. A framework generally designated as 5, and described in detail hereinafter, is erected upon said top wall.

Disposed approximately centrally upon said top wall is a fluid motor designated generally as 8. Surmounting said fluid motor is a seating assembly designated generally as 9, which in turn supports a carrier assembly designated generally as 10. The carrier assembly is mounted upon the seating assembly in such a manner as to afford universal tilting travel of said carrier assembly to determine the amount and angle of imbalance of a tire mounted thereon. A carriage 11, is suspended from the framework for reciprocable, rectilinear travel to and from the carrier assembly for purposes hereinafter explained.

FLUID MOTOR

Figure 8:
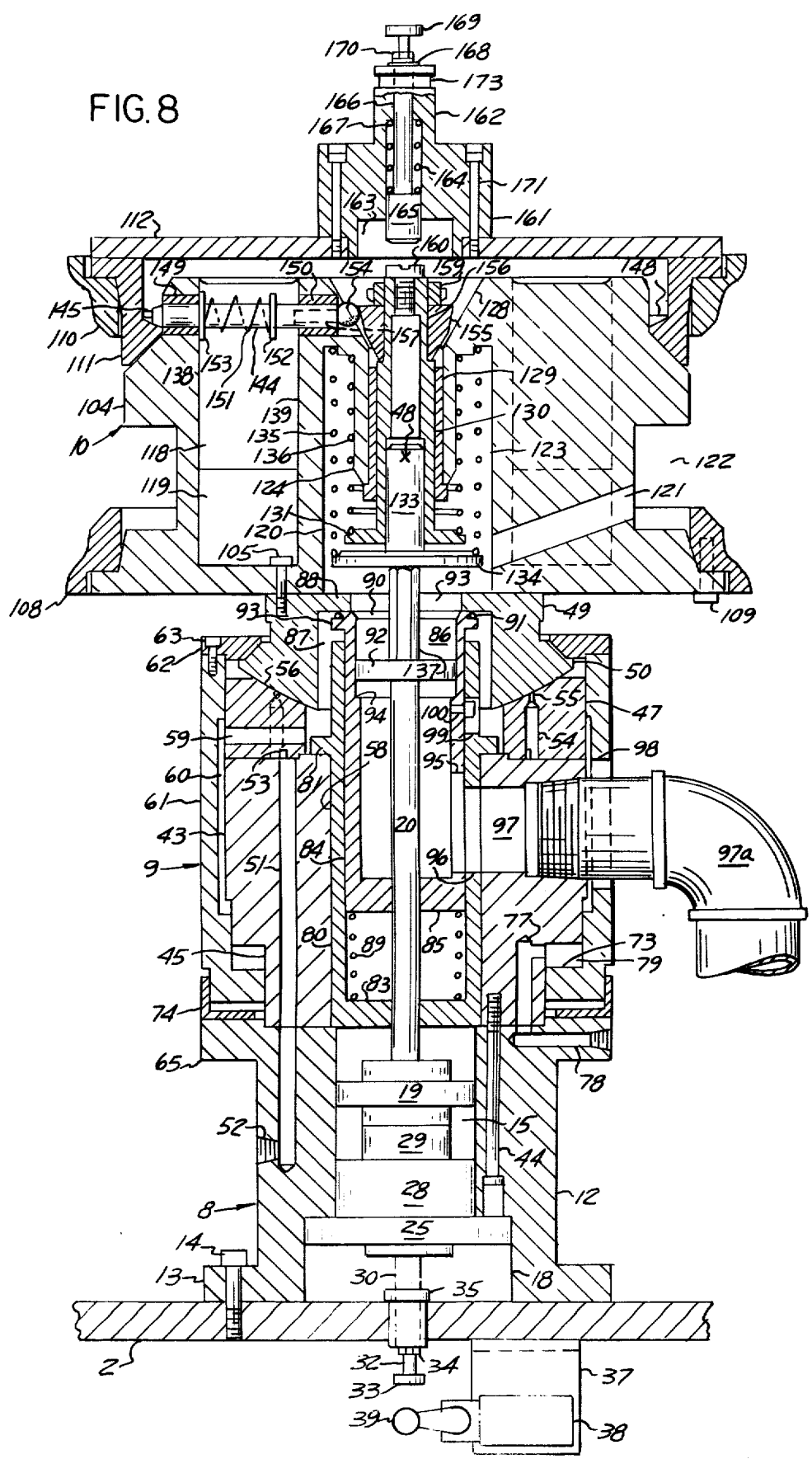
FIG. 8 is a partial, vertical, sectional view similar to FIG. 7, and taken on line 7—7 of FIG. 10, but with the upper rim element locked upon the carrier.
Figure 9:
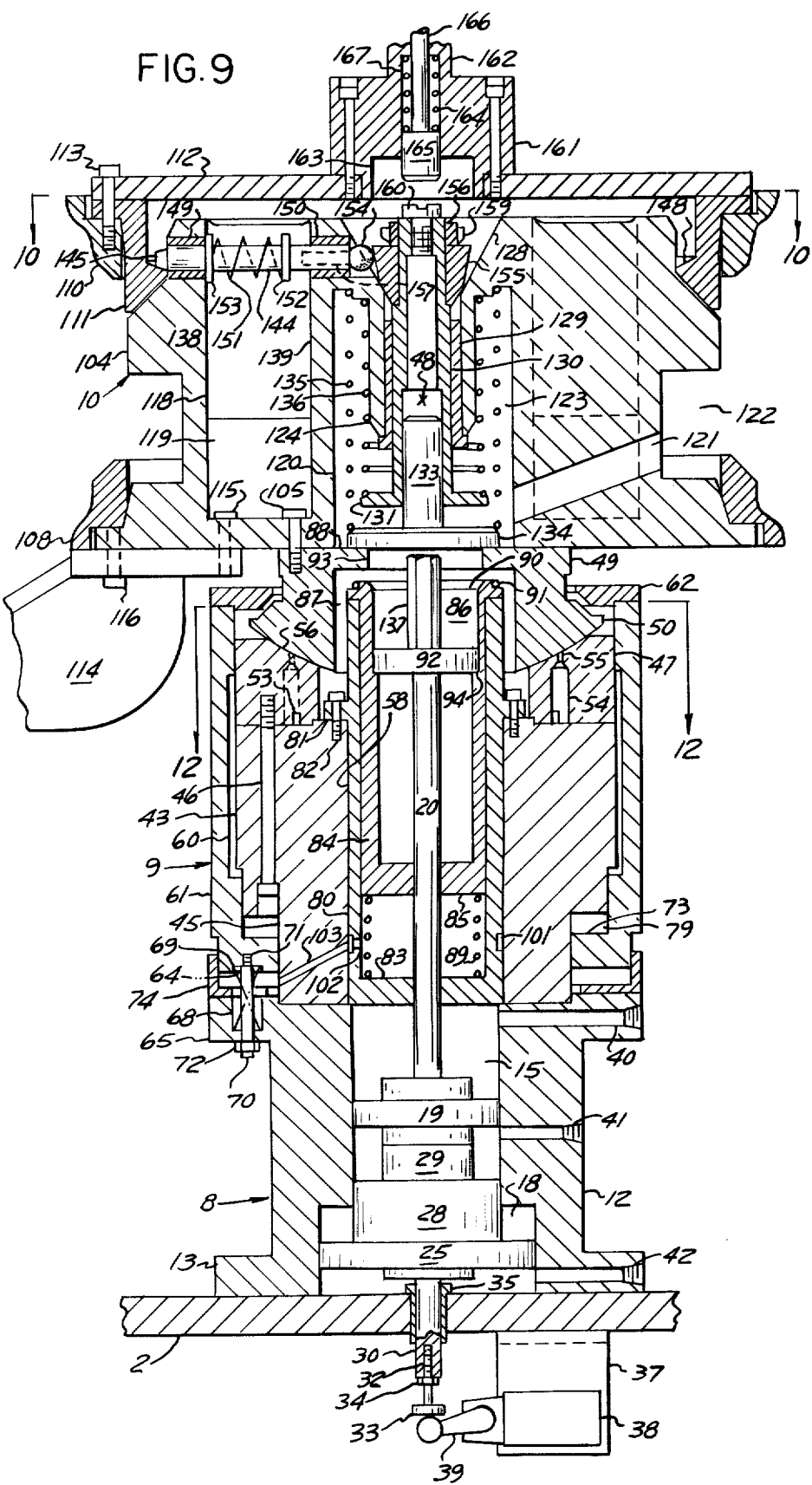
FIG. 9 is a partial, vertical, sectional view taken on line 9—9 of FIG. 11, but with the carrier free for tilting travel.

Referring in greater detail to the fluid motor 8, as seen in FIGS. 7, 8, and 9, said motor includes a cylinder block 12 mounted upon the central portion of the top wall 2. The cylinder block is formed with a lower annular flange 13 through which screws 14 secure the fluid motor to the top wall.

Said cylinder block is interiorly formed with an upper cylinder 15 which opens upon a lower cylinder 18 of substantially larger diameter, Disposed for reciprocable, vertical travel in said cylinder 15 is a driving piston 19. An actuator rod 20 has a lower end portion 21 reduced in diameter to be received in said piston 19, and downwardly terminates in a threaded portion 22, which receives a nut 23, disposed within a recess 24 in the bottom of the piston 19. A stabilizing piston 25 has reciprocable, vertical travel in the lower cylinder 18, and includes a central portion 28 which is slidably received in the upper cylinder 15. Said central portion upwardly terminates in a circular head 29.

An elongated screw 30 has a threaded end portion 31 received in the lower portion of said stabilizing piston 25 (FIG. 7), and threadedly receives (FIG. 9) in its lower end portion on actuating screw 32 which downwardly terminates in a flat circular head 33. A lock nut 34 resists movement of the actuating screw 32 on its longitudinal axis. It is desirable to provide a bushing 35 to guide the actuating screw 32 in its travel, and to resist wear effected by such travel. Mounted upon a bracket 37, a limit switch 38 is disposed beneath said table for actuation by said actuating screw 32 when the stabilizing piston 25 is in its lowermost position.

As clearly seen in FIG. 9, the cylinder block 12 is provided with a plurality of ports 40, 41 and 42, for the alternative introduction and withdrawal of fluid to motivate said pistons in their travel. Valve means (not shown) determine wheen each respective port is serving for the inflow or outflow of fluid.

SEATING ASSEMBLY

A pedestal 43 surmounts the cylinder block 12, as may be seen in FIGS. 7, 8, and 9, and elongated screws 44 (FIG. 7 and 8) extend through said cylinder block and into said pedestal to secure the latter in position. The pedestal is circular in horizontal cross section, and has a lower end portion 45 substantially reduced in diameter.

The pedestal carries a seating member 47 formed concavely with an arcuately spherical surface having a locus point 48. Surmounting said seating member is an annular pivot element 49 having its lower portion 50 diametrically enlarged, and formed with a convex surface of a sphericity complementary to that of the seating member 47.

To minimize friction between said arcuately spherical surfaces, it is desired to employ a fluid under pressure. The present disclosure employs air. To direct said air between the complementary spherical surfaces, vertical air holes 51 extend through said pedestal 43 and said cylinder block 12, and access to a source of compressed air (not shown) is provided by horizontal air hole 52 in the cylinder block.

Figure 12:
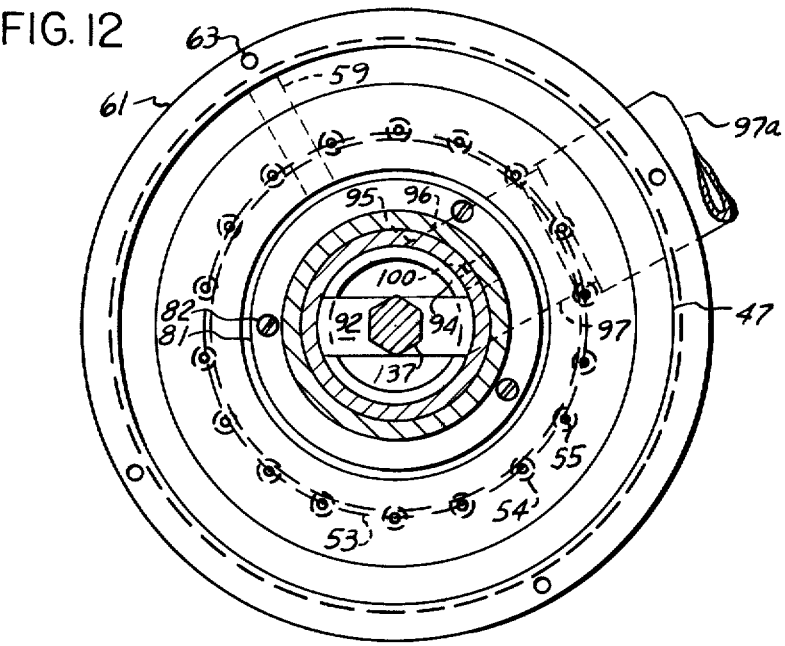
FIG. 12 is a partial, horizontal, sectional view taken on line 12—12 of FIG. 9, and showing the concave spherical member with the convex spherical member removed.
Figure 13:
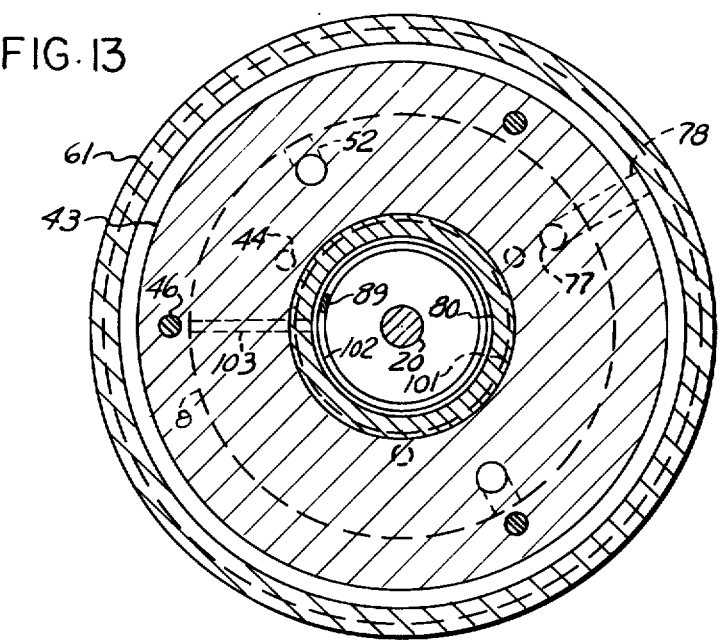
FIG. 13 is a partial, horizontal, sectional view taken on line 13—13 of FIG. 7, but on a larger scale.

Air introduced through holes 51, 52 flows into an annular channel 53 formed in the bottom surface of the seating member 47. Said seating member is clearly shown in FIG. 12 (a horizontal cross section), which omits the annular pivot element 49 for purposes of clarity. In said view it is clearly seen that the seating member is provided with a circular series of air holes 54 which open on the aforesaid annular channel 53. The upper portion 55 of each air hole 54 is reduced in diameter, and opens in the spherically concave surface 56.

Some of the air escapes inwardly of the spherical surfaces and into a hole 58 formed in the center of said seating member. From said hole 58 there extends horizontally through said seating member an air escape hole 59 which communicates with an annular recess 60 interiorly formed in a cylindrical sleeve 61 which encircles the pedestal. Said sleeve has slight reciprocable vertical travel upon said seating member 47, and is surmounted by an annular clamp plate 62 secured to said sleeve by screws 63. Said clamp plate is shown in its downward clamping position in FIGS. 7 and 8, to restrain the pivot element from tilting travel, while a tire is loaded or unloaded from the carrier. In FIG. 9, the cylinder sleeve and clamp plate 62 are shown raised to allow said tilting travel. When raised, the clamp affords escape of some lubricating air outwardly of the pivot element 49.

As is best seen in FIG. 9, a plurality of springs 64 urges said cylindrical sleeve 61 to slide normally upwardly on said pedestal. It should be noted that the cylinder block 12 is formed with an annular upper flange 65, and that flange has, in its upper surface, spring-receiving sockets 68. Corresponding recesses 69 are formed in the bottom surface of the cylindrical sleeve 61, and adjusting screws 70 have their upper ends 71 threadedly received in said cylindrical sleeve. The lower end portions of said adjusting screws are threaded to receive nuts 72 which may be adjusted to limit upward travel of the cylindrical sleeve responsive to said springs 64.

Figure 14:
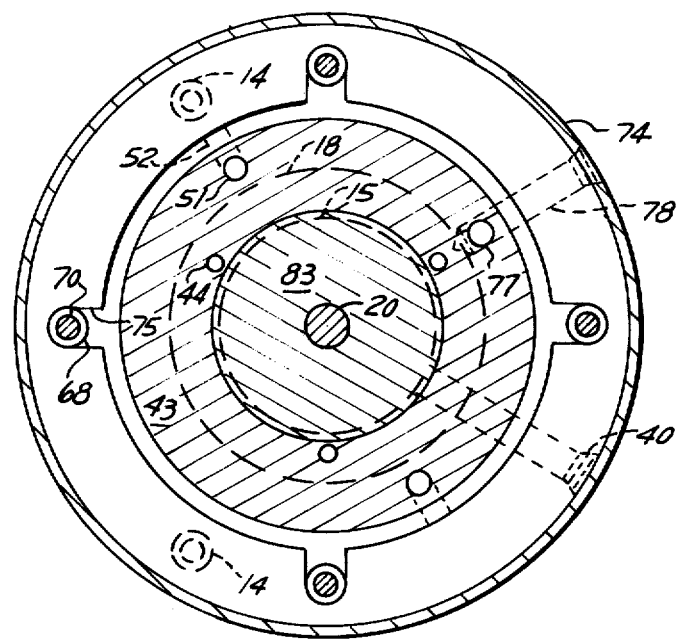
FIg. 14 is a partial, horizontal, sectional view taken on line 14—14 of FIG. 7, but on a larger scale, and showing in dash line the ports for the tandem pistons.

The cylindrical sleeve 61 downwardly terminates with an interiorly projecting annular flange 73, which has sliding travel upon the reduced diameter 45 of the lower portion of said pedestal. A guard 74 is disposed upon the cylinder block 12 to encircle the lower portion of said cylindrical sleeve, and protect the springs and adjusting screws. Recesses 75 are formed in said guard to accommodate the springs 64. Such recesses are seen most clearly in FIG. 14, the springs being omitted for clarity of drawings.

The cylindrical sleeve 61 is impelled to travel downwardly, and overcome the urgings of the aforesaid springs 64, by the admission of a fluid, which may be air, through a continuous port (FIGS. 7 and 8) having a vertical passage 77 formed in the pedestal 43, and continuing in a horizontal passage 78 formed in the upper flange 65 of said cylinder block 12. Such fluid enters an annular chamber 79 to take effect on the cylindrical sleeve 61.

AIR CONDUIT IN SEATING ASSEMBLY

A liner 80 is secured to a central hole 58 in the pedestal 43 by means of a flange 81 and screws 82. It should be noted that the liner 80 is formed with a bottom wall 83. The upper end portion 86 of the liner 80 extends upwardly from the aforesaid flange 81, and into a downwardly opening chamber 87 formed in the annular pivot element 49. Formation of said chamber 87 leaves a wall 88 at the top portion of said annular pivot.

A spring 89 is received in the lower end portion of said liner 80, and reacts between the bottom wall 83 of the liner, and the bottom wall 85 of a hollow piston 84 to urge said piston to an upper position to engage the open end 90 of said piston with the aforesaid wall 88. The open end portion 90 of said piston receives a sealing element 91 to effect a fluid-sealing engagement of said open end 90 with said wall 88, encircling a hole 93 formed in said wall.

A dog 92 is carried by the actuator rod 20, and has vertical travel with said actuator rod to any one of three positions, as hereinafter discussed. Interiorly of the open end 90 of the hollow piston 84, an annular shoulder 94 is formed by an annular recess, whereby said shoulder may be engaged by said dog 92 to downwardly retract the hollow piston 84 to disengage the open end 90 from said wall 88. This leaves the wall 88 disengaged, and with the unclamping of the clamping plate 62, when the cylindrical sleeve 61 is in its upper position, as shown in FIG. 9, the annular pivot element 49 is free for unhampered tilting travel.

A hole 95 is formed in the side wall of the hollow piston 84, and is aligned with a hole 96 formed in the side wall of the liner 80. A further hole 97 is formed in the pedestal 43, and communicates with the aforesaid holes 95, 96. Still a further hole 98 is formed in the cylindrical sleeve 61. The hole 97 is formed with a pipe tap to receive a pipe 97a which connects with a source of compressed air (not shown).

The hole 98 in the cylindrical sleeve 61 is of a diameter sufficient to accommodate the above described sliding travel of said cylindrical sleeve 61 while avoiding interference with the pipe 97a. The hole 95 in the side wall of the hollow piston 84 is of a diameter adequate to accommodate the sliding travel afforded said hollow piston without obstructing communication with the holes 96 and 97.

Finally, a vertically elongated slot 99 is formed in the side wall of the upper portion 86 of the liner 80, and a stop screw 100 has its threaded end portion received in the wall of the hollow piston. The head of said screw is received in said slot 99, for vertical sliding travel therein in association with the hollow piston. The purpose of the screw 100, as may now be readily apparent, is to resist rotation of the hollow piston about its vertical axis, which rotation could result in misalignment of the aforesaid holes 95, 96, 97 for passage of air to and from the interior of the hollow piston.

At the lower end portion of the liner 80, in the exterior surface thereof, is formed an annular groove 101 (FIG. 9). A hole 102 communicates from the interior of the hollow piston to said groove, and a hole 103 extends through the side wall of the reduced diameter 45 of the pedestal 43. As the hollow piston 84 moves up and down, air will tend to be expanded and compressed in the lower portion of the liner 80. The described air passages afford intake and expulsion of air to accommodate the vertical travel of the hollow piston 84 without such compression and expansion.

CARRIER ASSEMBLY

With reference now to the carrier assembly 10, a carrier body 104 surmounts the annular pivot element 49, and is secured thereon by screws 105. Mounted upon the carrier body 104 is a lower rim element 108, which is secured thereto by a plurality of screws 109. Said lower rim element is contoured to effect an air sealed engagement with the lower bead of a tire placed upon the carrier. An upper rim element 110 is carried by a mounting ring 111, which is surmounted and sealed by a circular plate 112. As may be seen in FIG. 9, screws 113 maintain said circular plate, mounting ring, and upper rim element in assembly.

A variety of means is available to determine the amount and angular direction of imbalance. For example, a bubble level (not shown) may be mounted upon a level arm 114, which (as is seen in FIG. 9), may be secured to and beneath the carrier body 104, as by screws 115, 116. One may also employ on the carrier, diametrically opposite the level arm 114, a counterbalance weight (not shown), which may also be mounted to or beneath the carrier body 104.

Figure 10:
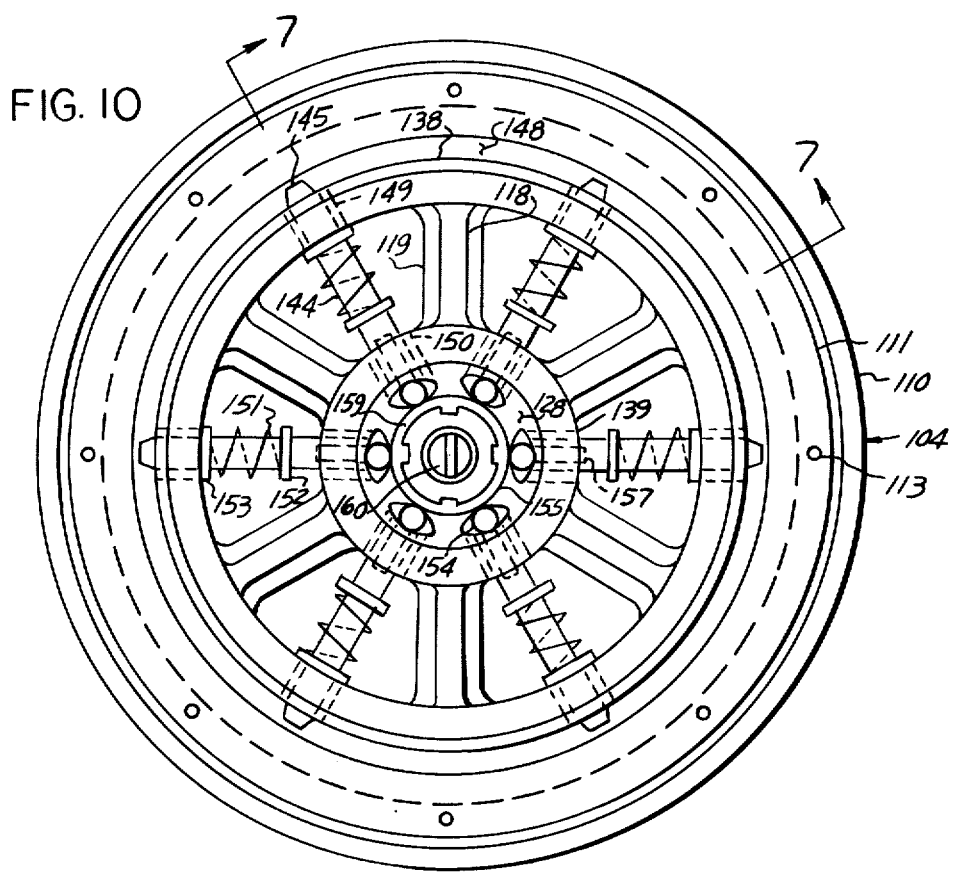
FIG. 10 is a partial, horizontal, sectional view on line 10—10 of FIG. 9, showing the upper rim locking mechanism in its locking position.
Figure 11:
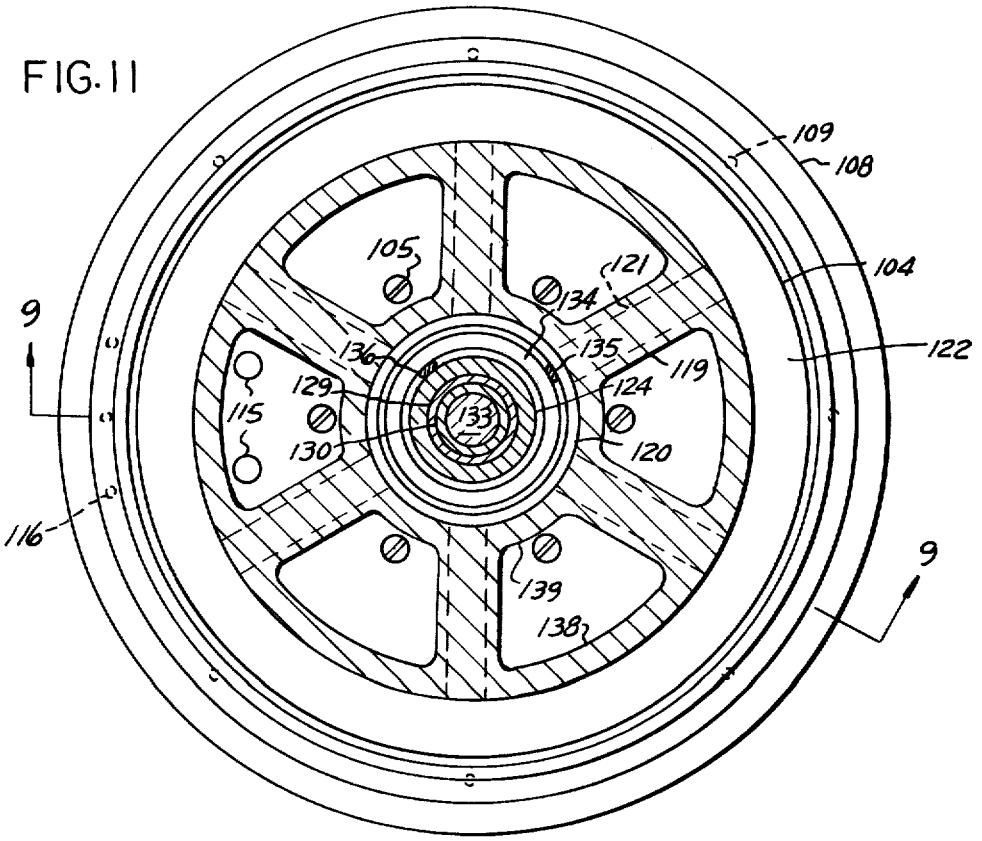
FIG. 11 is a partial, horizontal, sectional view taken on line 11—11 of FIG. 7.

Distinctly shown in the vertical, sectional views of FIGS. 7, 8, and 9, as well as in the horizontal sections of FIGS. 10 and 11, the carrier body 100 is formed with a plurality of radially extending ribs 118 which downwardly terminate in thickened portions 119. Interiorly of the carrier body, and downwardly opening therefrom, is a central chamber 120 from which a hole 121 extends radially through each said rib to an annular groove 122, formed in the exterior circumferential surface of the carrier body.

The upper portion of the chamber 120 constitutes an annular chamber 123, by virtue of a hollow core 124 which projects downwardly into said central chamber. Said hollow core 124 upwardly, interiorly terminates in a conically shaped socket 128. A sleeve 129 is press-fitted, or otherwise secured in said hollow core to slidably receive a tubular plunger 130 which downwardly terminates in an annular flange 131. The tubular plunger 130 slidably receives a valve stem 133. The valve downwardly terminates in a substantially concentric, integral disc 134.

A spring 135 is disposed within said annular chamber to bear upon the valve disc 134, and urge said valve downwardly to a normally closed position in which said disc will obstruct the hole 93 in the wall 88, and resist the passage of air through said hole. In such closed position, the valve disc resists escape of air from an inflated tire during tilting travel of the pivot element 49. A second spring 136 bears upon the annular flange 131 of the tubular plunger 130 to urge the tubular plunger in downward travel. An upward extension 137 of the actuator rod 20, may be threadedly engaged in the upper end portion of the actuator, so as to engage the bottom surface of the valve disc 134 and force said disc upwardly against the urging of the spring 135. Thus, the rod 20 and extension 137 constitute a counterdrive means to overcome the springs 135, 136.

LOCKING MECHANISM FOR UPPER RIM ELEMENT

As may be clearly seen in FIGS. 10 and 11, the carrier body is formed with an outer, annular wall 138, and an inner annular wall 139, spaced by and conjoined by the aforesaid ribs 118. Between each pair of ribs there is slidingly received a horizontally disposed lock pin 144, formed with a tapered end 145. The interior, circumferential surface of the mounting ring 111 (to mount the upper rim element 110) is formed with an annular inclined surface 148, so that, when said pins are driven radially outwardly as hereinafter described, the aforesaid tapered ends 145 of said lock pins 144 engage upon said inclined surface 148 to resist escape of the upper rim element 110 from the carrier body 104 during inflation of a tire, and tilting travel of the pivot element 49. One may employ bushing 149, and 150 in said annular walls to avoid undue wear of the walls themselves.

It may be noted that springs 151 react between the outer annular wall 138, and a washer 152, or the like, secured to the lock pins 144 to function as a release drive means to urge said pins radially inwardly toward the aforesaid vertical axis of the device to a release position when said actuator rod 20, 137 asserts its purpose as a counterdrive. If desired, a further washer 153 may be disposed upon said pin to bear against the wall of the carrier to confine said springs between said washers 152 and 153.

The inner end face of each locking pin 144 is indented to receive a portion of a ball 154, and the action of each aforesaid spring 151 tends to imprison the ball 154 between the ends of said locking pins and the surface of a cam, in the form of a conically tapered, locking pin drive element 155. Said drive element is mounted upon a reduced diameter 156 of the plunger 130, and is secured against dislodgement from said reduced diameter by a lock nut 159. A flat headed screw 160 is threadedly received in the upper end portion of said tubular plunger. If desired, hardened dowels 157 may be inserted in the lock pins 144 to resist wear from operation of the device. The spring 136 serves as a lock drive means to urge said cam 155 to a lock position.

UPPER RIM ELEMENT LATCH MEANS

Concentrically surmounting the circular plate 112 is a plunger housing 161, upwardly terminating in a reduced diameter to form a neck 162. Interiorly, said housing is formed with a downwardly opening recess 163 and a plunger chamber 164. Disposed within the plunger chamber 164 is plunger head 165, having an upwardly elongated plunger stem 166. A spring 167 confined in the upper portion of said plunger chamber 164 urges said plunger head normally downwardly. The plunger stem 166 carries a snap ring 168 to limit the downward travel of the plunger 165, 166 responsive to said spring. An actuator screw 169 is threadedly received in the upper end portion of the plunger stem 166, and is adjustably secured therein by a lock nut 170. The neck 162 of the plunger housing 161 is formed with an annular groove 173 to receive latch means described below.

CARRIAGE FOR UPPER RIM ELEMENT

Figure 15:
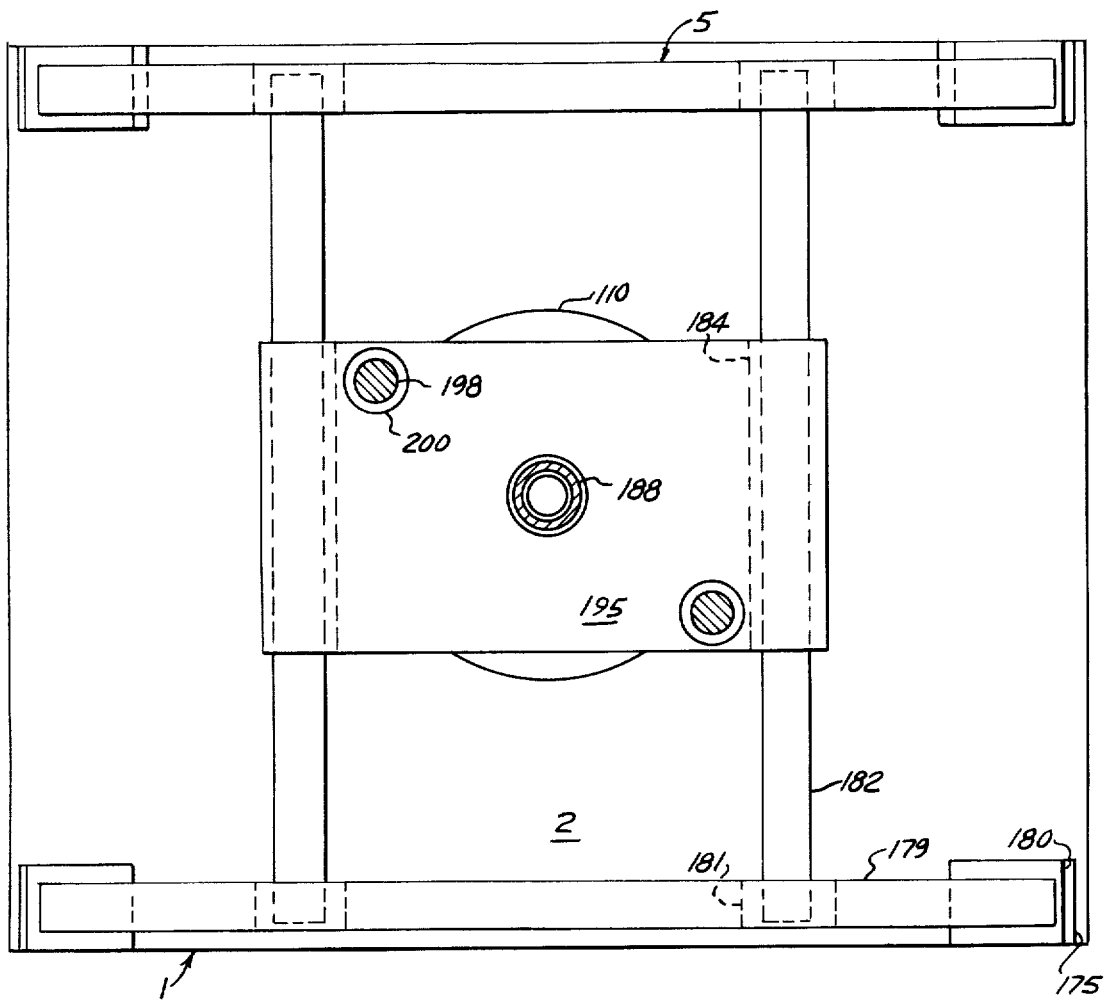
FIG. 15 is a plan view of the balancing machine, housing, and superstructure taken on line 15—15 of FIG. 1.

The aforesaid framework 5 comprises vertical, rectangular beams 174 having secured, as by welding, a lower plate 175 and an upper plate 178 at the ends of said beams. Lateral, horizontal elements 179 extend between and conjoin the laterally spaced pairs of said vertical beams, said horizontal elements carrying end plates 180 which surmount upper plates 178, and further carrying intermediate plates 181. Transverse elements 182 (FIG. 15) extend front to rear, and have secured to the end portions thereof, plates 183 which are secured to and beneath the aforesaid intermediate plates 181. The framework, as described at this point, may be secured together as by screws (not shown) employed in the respective abutting plates.

A mounting plate 185 is mounted upon the center plates 184 carried by the transverse horizontal elements 182. Approximately centrally of said mounting plate is disposed a piston 188, having piston rod 189 extending downwardly through said plate to impart vertical, reciprocable travel to the carriage 11. A U-shaped bracket 192 has its legs terminating in transversely extending flanges 193, which flanges are secured by screws 194, on the upper surface of a channel plate 195 which constitutes the body of the carriage 11. A screw 190 secures the horizontal span 196 of the U-shaped bracket 192 to the end of the aforesaid piston rod 189.

Further comprising a part of the carriage are guide rods 198 which have their lower end portions secured in blocks 199. The blocks 199 may be welded or otherwise secured to the carriage body 195, and horizontally disposed screws or dowels (not shown) may extend through said blocks and the lower end portions of the guide rods 198 to interconnect the guide rods to the blocks. The guide rods are afforded vertical sliding travel through the mounting plate 185 by means of bushings 200 fixed in said mounting plate.

Figure 3:
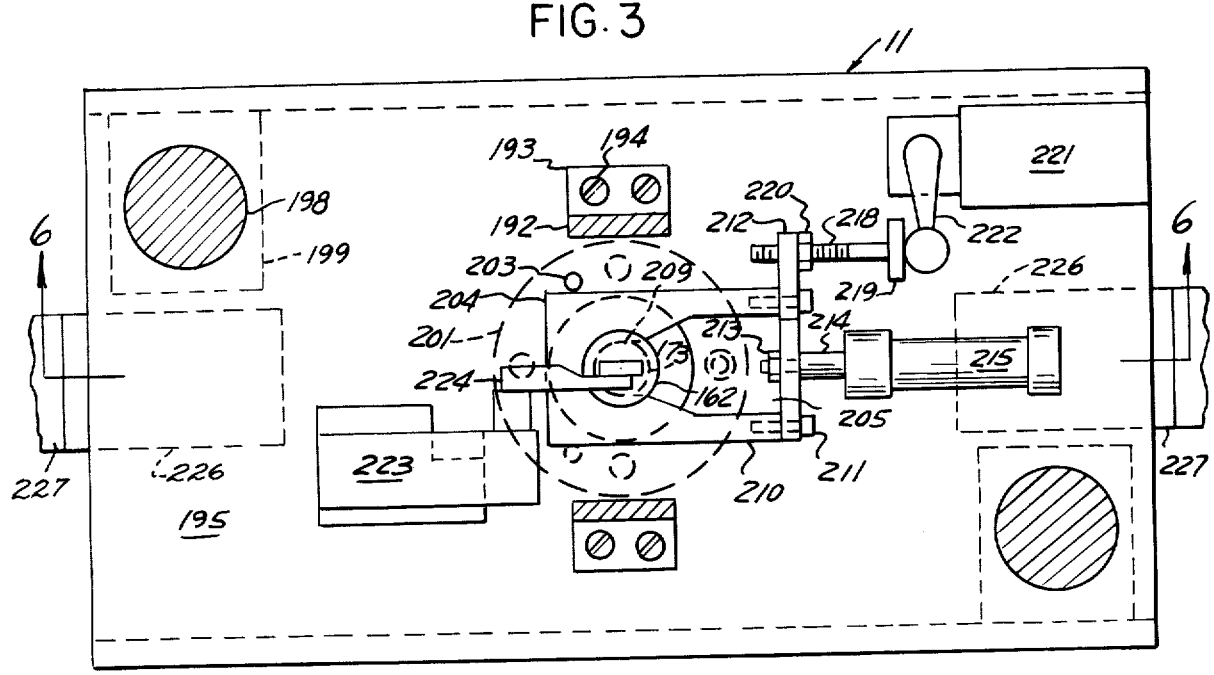
FIG. 3 is a horizontal, partial, sectional view on line 3—3 of FIG. 1, but on a larger scale, omitting members of a frame surmounting the housing.
Figure 4:
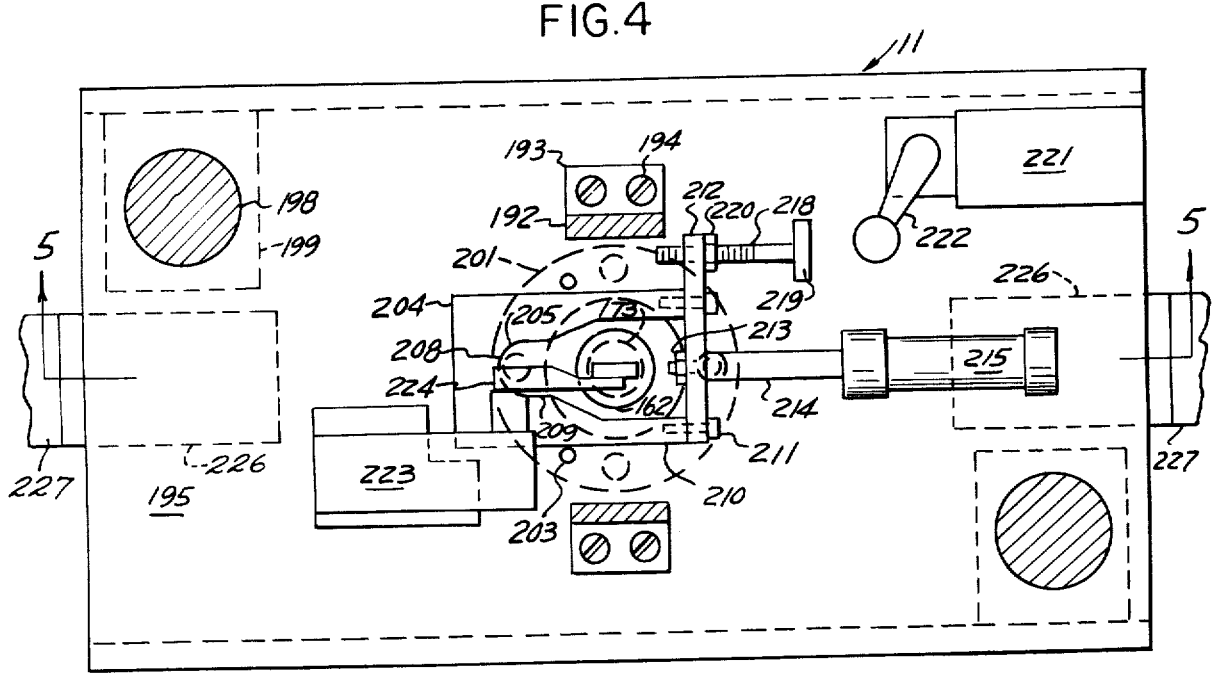
FIG. 4 is a horizontal, partial, sectional view on 4—4 of FIG. 2, and on a larger scale.
Figure 5:
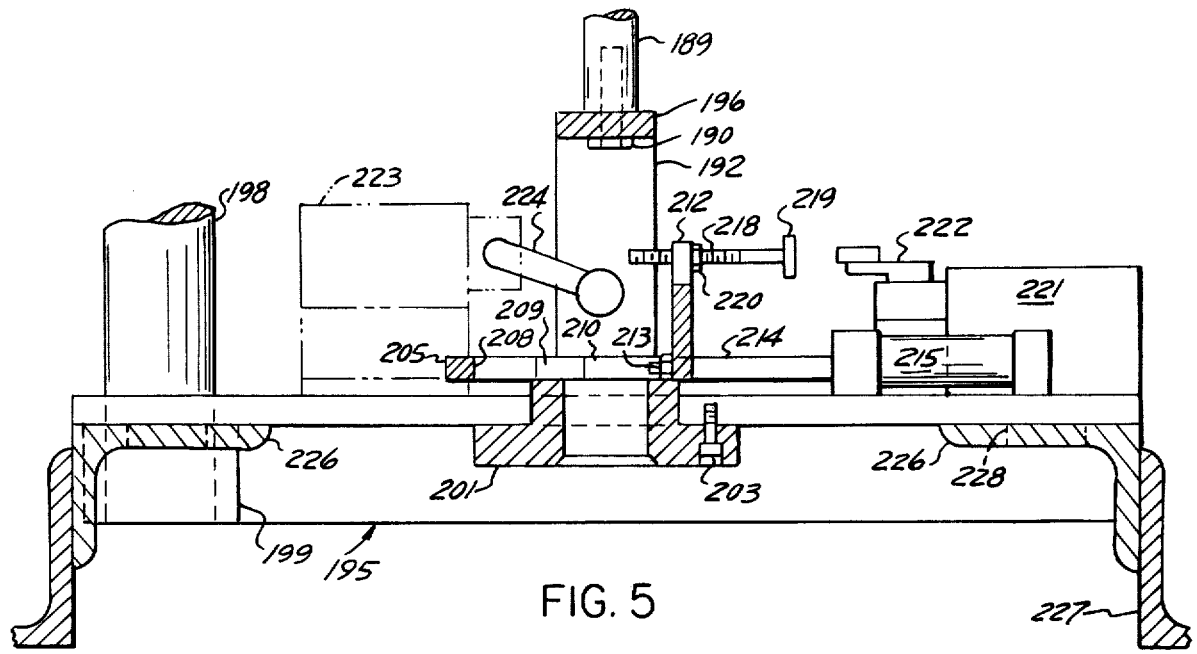
FIG. 5 is a vertical, partial, sectional view on line 5—5 of FIG. 4, showing the upper rim carriage in isolation.

The carriage body 195 carries, approximately centrally thereof, a rest bushing 201, which bushing, as may be seen in FIG. 6, engages and rests concentrically upon the plunger housing 161. With the carriage in its down position, to deposit the upper rim element 110 on the carrier body 104, the rest bushing 201 encircles the upwardly extending neck 162 of the aforesaid plunger housing 161, but exposes the annular groove 173 formed on said head. With the carriage down, a latch 204 having reciprocable, rectilinear travel, is disposed to engage the annular groove 173 in a slot 205. The slot, it may be noted in FIGS. 3 and 4, terminates in an arcuate end portion 208 which accommodates the arcuate contour of the annular groove 173, and said arcuate end of the slot merges into opposed flats 209 forming the sides of said slot.

Formation of the said slot 205 leaves the latch 204 with a pair of spaced legs 210, the end portions of which are secured as by screws 211 to an actuating plate 212. A nut 213 secures said actuating plate to the end of a piston rod 214, said piston rod being actuable by a fluid cylinder 215.

An actuator screw 218 passes threadedly through the actuating plate 212, said screw being formed with a head 219, and receiving a lock nut 220 to secure the screw in a desired position of adjustment relative to a limit switch 221. Said limit switch has an arm 222 which is contacted by the head 219 of screw 218 when the cylinder 215 is energized to retract the piston rod 214.

There is further secured to the carriage a limit switch 223 having an arm 224 actuable by the head of the earlier mentioned actuator screw 169 for purposes hereinafter described.

Finally, at each end of the carriage is mounted a pair of angle irons 226, 227. The former may be slotted as at 228 for horizontal adjustment on the carriage. Screws (not shown) retain the angle irons in a desired position. Should the upper tire bead be so effectively engaged by the upper rim element as to stick (as may occur) the carriage would, of course, tend to raise the tire from the carrier. The angle irons 227 are adjusted to depress the sidewall of the tire and free the upper bead, prior to raising of the carriage.

SEQUENCE OF OPERATION

To begin the sequence of operation, the carriage 11 is in its upwardly, retracted position, and the above described carriage latch mechanism is engaged with the aforesaid neck 162 of the plunger housing 161 secured to the plate 112, whereby the upper rim element 110 is raised clear from the carrier 104 to afford loading upon the carrier of a tire to be balanced. At this point, fluid has been admitted through the ports 77, 78 to overcome the urging of the springs 64, forcing the cylindrical sleeve 61, and the annular clamp plate 62 downwardly to bring the clamping plate 62 to bear upon the enlarged portion 50 of the annular pivot element 49, and positively resist any tilting travel thereof while a tire is being loaded upon the carrier.

With the tire mounted upon the carrier, the piston 188 is energized to drive the piston rod 189, and the carriage 11 downwardly to deposit the upper rim element 110 upon the carrier. When this occurs, the drive piston 19, and the stabilizing piston 25 in the cylinder block 12 are in their uppermost positions (FIG. 7). The valve 133, 134 is in its uppermost possible position, as is the plunger 165, 166. Consequently, the head of the screw 160 is engaged by the bottom face of the plunger head 165, and drives said plunger head upwardly against the urging of the spring 167, to the position shown in FIG. 6. In this position, the plunger 165, 166, causes the head of the actuating screw 169 to raise the arm 224 of limit switch 223. Such switch is so disposed in electrical circuitry (not shown) as to obviate the inflation of a tire mounted upon the carrier until the lock pins 144 have positively secured the upper rim element 110, mounting ring 11, and the plate 112 against possible dislodgement by such inflation.

The piston 19 is now disposed in its second position, as shown in FIG. 8, by the admission of fluid through the port 40 (FIG. 9), and the emission of fluid through the port 41. The stabilizing piston 25 remains in its initial position, as shown in FIGS. 7 and 8, and is maintained in such position by the admission of fluid through the lower port 42. The larger diameter of the central portion of the stabilizing piston 25 enables it to resist the fluid pressure urging the driving piston 19 downwardly and stabilizes the driving piston and the actuating rod in their intermediate position as shown in FIG. 8.

Clearly, as is seen in FIG. 8, the valve 134 is allowed to descend, responsive to the urging of the spring 135, to an intermediate position and simultaneously, the plunger 130, 131, is allowed to descend, responsive to the urging of the spring 136, to its lowermost position. Such position is dictated by the engagement of the aforesaid conical drive 155 with the respective balls 154 to cam the respective lock pins 144 radially outwardly, and engage their tapered ends 145 with the annular inclined surface 148 of the mounting ring 11. This secures the mounting ring 111, and the asociated upper rim element 110, and the air sealing plate 112 securely upon the carrier. At this point, the carriage is raised to allow adequate seating of the upper bead of a tire upon the rim element.

With the upper rim element so secured, it will be clear that air may now be admitted under pressure through the pipe 97a, and through the holes 97, 96, and 95 and into the conduit formed by the hollow piston 84. The air then passes around the diametrically elongated dog 92, through the hole 93, into the lower portion of the chamber 120, and through the radial air holes 121 to the toroidal chamber of a tire (not shown).

The tire being inflated to a desired pressure, the pistons 19 and 25 are energized by the admission of fluid to the cylinder block 12 through the upper port 40 (FIG. 9), and evacuation of fluid through the middle port 41, and the lower port 42. With the stabilizing piston 25 in its lowermost position, the aforesaid actuating screw 32 engages the arm 39 of limit switch 38, which effects circuitry (not shown) to cause the evacuation of fluid from the annular chamber 79 in the cylindrical sleeve 61, allowing the springs 64 to take effect, and urge the sleeve 61 and the clamping plate 62 to its raised position, as shown in FIG. 9, to afford tilting travel of the annular pivot element 49, 50.

When the balancing of a tire is completed, means (not shown) governs the flow of fluid in the respective ports 40, 41, 42 to drive the piston 25 to its upper position, and to drive the piston 19 to its intermediate position, as shown in FIG. 8. This raises the dog 92 to allow the spring 89 to urge the hollow piston 84 to re-establish the continuity of the aforesaid air passage from the pipe 97a to a tire mounted upon a carrier. The actuator extension 137 rises to drive the valve 133, 134 to its intermediate position, and afford the evacuation of air from the tire through the now-continuous air passage and out through the pipe 97a. Following evacuation of air from the tire, the piston 19 is energized to move to its uppermost position, as shown in FIG. 6, in which position the valve 133, 134 is driven to its uppermost position, in which it carries the plunger 130, 131 upwardly to negate the urging of spring 136, and moves the conical pin drive 155 upwardly, affording play to the springs 151 to establish the lock means 144 in a release position.

It would be desirable to have the carriage descend, by means of the aforesaid piston 188, 189, and to activate the latch operating fluid cylinder 215 to drive the piston rod 214 to the right, as shown in the various views, and thus to engage the latch 204 with the neck 162 preparatory to lifting the upper rim element 110 from the carrier assembly 10. Thus, upon deflation of the tire, the piston 188 may be energized to draw the piston rod 189 upwardly to effect retraction of the carriage assembly 11 with the upper rim element 110, to afford removal of the now balanced tire, and the application to the carrier of another tire to be balanced.

It is noted that the carriage rises alternatively with and without the upper rim element. Whether it carries the upper rim element depends, of course, on whether the latch 204 is engaged with the annular groove 173 of the neck 162 of the plunger housing 161. As aforesaid, such engagement is effected by fluid cylinder 215, which, by piston rod 214, carries actuator screw 218 to operate limit switch 221. The function of said limit switch is to indicate by appropriate electrical circuitry (not shown) whether the latch is engaged or disengaged, such indication governing whether the above described sequence of operation occurs, or whether a balanced tire is unloaded, and another tire is loaded on the carrier.

What I claim is:

1. A balance testing machine for pneumatic tires including, a base, a seating member mounted on said base and adapted to pivotally receive, a carrier seated upon the seating member, and adapted for universal tilting travel thereon relative to a substantially vertical axis, said carrier including, tire retention to removably receive a tire for air sealed retention on the carrier, air conducting means to inflate and deflate a tire retained by said retention means, a first air passage in said-seating member having optional continuity with, a second air passage in said carrier, means to interrupt said continuity, to afford said tilting travel, after inflation of a tire and to restore said continuity for deflation of such tire, and means to resist escape of air from a tire when said continuity is interrupted.

2. A balance testing machine as set forth in claim 1, a hole formed in said seating member,
conduit means defining said first air passage, and being received in said hole for travel therein between a normal position to establish said continuity, and a second position to interrupt said continuity,
conduit drive means urging travel of said conduit means to said normal position, and
said means to interrupt said continuity being counterdrive means to drive said conduit means to said second position.

3. In a balance testing machine as set forth in claim 2, said conduit means being a hollow, driven piston having an open end,
said second air passage including an aperture opening from said carrier,
said open end engaging said carrier to establish said continuity through said aperture responsive to said conduit drive,
said open end disengaging from said carrier responsive to said counterdrive means.

4. A balance testing machine as set forth in claim 3, said counterdrive means including an actuator having reciprocable travel and adapted to releasably engage and drive said hollow driven piston to said second position,
said hollow driven piston being adapted for such releasable engagement, and
a power source to impel said actuator in said reciprocable travel.

5. In a balance testing machine as set forth in claim 4, said power source being a fluid motor, having
a cylinder block mounted upon said base,
a driving piston in said cylinder block to drive said actuator in said reciprocable travel, and
said seating member surmounting said cylinder block to dispose said first passage in the path of travel of said actuator.

6. A balance testing machine as set forth in claim 5, an end wall on said hollow, driven piston,
said actuator extending through said end wall, and
means carried by said actuator adapting said actuator to effect said releasable engagement with said hollow, driven piston.

7. In a balance testing machine as set forth in claim 6, said tire retention means including,
a lower rim element adapted to engage the lower bead of a tire loaded thereon,
an upper rim element removably receivable upon said carrier, and adapted to engage the upper bead of such a tire,
said upper rim element and lower rim element being adapted to retain a tire inflated thereon.

8. In a balance testing machine as set forth in claim 7, a locking mechanism associated with said carrier and having a locked position to secure said upper rim element on said carrier, and a release position to afford deposit upon or removal of said upper rim element from said carrier
lock drive means to urge said locking mechanism to said lock position,
said counterdrive means being effective to negate said urge, and release drive means to drive said mechanism to said release position when said counterdrive means negates said urge.

9. In a balance testing machine as set forth in claim 8, said locking mechanism employing at least one elongated pin actuable between a pin-lock position of engagement with said upper rim element, responsive to said lock drive means, and a pin-release position of disengagement, responsive to said release drive means.

10. In a balance testing machine as set forth in claim 9,
said lock drive means including,
a cam having travel between a pin-lock position and a pin-release position,
said lock drive means imposing said urge upon said cam, said cam transmitting said urge to said pin,
said counterdrive means acting upon said cam to negate said urge,
and afford effect to said drive means.

11. In a balance testing machine as set forth in claim 10,
said actuator having reciprocable travel, between a position of releasable engagement with said cam to negate said urge, or a position of disengagement from said cam to yield to said urge,
said means to resist escape of air being a valve having an open position and a closed position,
means interconnecting said valve and said cam to enable said actuator to concurrently move said valve to an open position and to move said cam to a release position.

12. In a balance testing machine as set forth in claim 11, said tire retention means including,
a carriage having travel to carry said upper rim element between a first position, seating said upper rim element upon said carrier to engage the upper bead of a tire loaded thereon, and a remote position withdrawn from said carrier to afford loading and unloading of a tire upon the carrier.

13. In a balance testing machine as set forth in claim 12,
means on said carriage to releasably engage said upper rim element for said travel, and
means on said upper rim element adapted for engagement by said means on said carriage.

14. In a balance testing machine as set forth in claim 13,
said means on said carriage being latch means carried by said carriage, and
said means on said upper rim element being a supplementary latch means for engagement by said first named latch means to carry said upper rim element with said carriage in said travel.

15. In a balance testing machine as set forth in claim 14,
means carried by said carriage to engage the side wall of a tire mounted on said carrier, to free the upper bead of such a tire from said upper rim element, upon travel of said carriage to said first position.

16. In a balance testing machine as set forth in claim 1,
said means to resist escape of air being a valve, having an open position and a closed position to respectively afford or resist air flow in said air conducting means, and
means to establish said valve alternatively to said positions.

17. In a balance testing machine as set froth in claim 16, said last mentioned means being,
   valve drive means to move said valve to said closed position, and
   counterdrive means to drive said valve to said open position.

18. In a balance testing machine as set forth in claim 17,
   said second air passage including a chamber formed in said carrier,
   a wall separating said chamber from said first passage,
   an aperture in said wall, and
   a valve disc covering said aperture in said closed position, and uncovering said aperture in said open position.

19. In a balance testing machine as set forth in claim 18,
   said valve drive means being a yieldably resistant member disposed in said chamber to impel said valve to said closed position,
   said counterdrive means being effective to overcome said yieldably resistant member to drive said valve to said open position.

20. In a balance testing machine as set forth in claim 18, said tire retention means including,
   a lower rim element mounted on the carrier to receive the lowermost bead of a tire mounted on said carrier,
   an upper rim element removably received upon said carrier and, adapted to engage the upper bead of such a tire,
   said upper rim element and lower rim element being adapted to retain air in a tire inflated thereon,
   a carriage having travel to carry said upper rim element between a first position, seating said upper rim element upon said carrier to engage the upper bead of a tire loaded thereon, and a remote position withdrawn from said carrier to afford loading and unloading of a tire upon the carrier.

21. In a balance testing machine as set forth in claim 20,
   means on said carriage to releasably engage said upper rim element for said travel, and
   means on said upper rim element adapted for engagement by said means on said carriage.

22. In balance testing machine as set forth in claim 21,
   said means on said carriage being latch means carried by said carriage, and
   said means on said upper rim element being a supplementary latch means for engagement by said first named latch means to carry said upper rim element with said carriage in said travel.

23. In a balance testing machine as set forth in claim 22,
   means carried by said carriage to engage the side wall of a tire mounted on said carrier, to free the upper bead of such a tire from said upper rim element, upon travel of said carriage to said first position.

24. In balance testing machine as set forth in claim 23,
   a locking mechanism associated with said carrier and having a locked position to secure said upper rim element on said carrier, and a release position to afford deposit upon or removal of said upper rim element from said carrier,
   lock drive means to urge said locking mechanism to said locked position,
   said counterdrive means being effective to negate said urge, and
   release drive means to drive said mechanism to said release position when said counterdrive means negates said urge.

25. In a balance testing machine as set forth in claim 24,
   said locking mechanism employing at least one elongated pin actuable between a pin-lock position of engagement with said upper rim element, responsive to said lock drive means, and said pin-release position of disengagement, responsive to said release drive means.

26. In a balance testing machine as set forth in claim 25, said lock drive means including,
   a cam having travel between a pin-lock position and a pin-release position,
   said lock drive means imposing said urge upon said cam, and
   said cam transmitting said urge to said pin,
   said counterdrive means acting upon said cam to negate said urge,
   and afford effect to said release drive means.

27. In a balance testing machine as set forth in claim 26, said counterdrive means including,
   an actuator having reciprocable travel between a position of releasable engagement with said cam to negate said urge, or a position of disengagement from said cam to yield to said urge,
   means interconnecting said valve disc and cam to enable said actuator to concurrently move said valve to an open position and to move said cam to a release position.

28. A balance testing machine as set forth in claim 18, said tire retention means including,
   a lower rim element adapted to engage the lower bead of a tire loaded thereon,
   an upper rim element removably receivable upon said carrier, and adapted to engage the upper bead of such a tire,
   said upper rim element and lower rim element being adapted to retain air in a tire inflated thereon.

29. A balance testing machine as set forth in claim 28,
   a locking mechanism associated with said carrier and having a locked position to secure said upper rim element on said carrier, and a release position to afford deposit upon or removal of said upper rim element from said carrier,
   lock drive means to urge said locking mechanism to said locked position,
   said counterdrive means being actuable to negate said urge, and
   release drive means to drive said mechanism to said release position when said counterdrive means negates said urge.

30. In a balance testing machine as set forth in claim 29,
   said locking mechanism employing at least one elongated pin actuable between a pin-lock position of engagement with said upper rim element, responsive to said lock drive means, and
   said release position of disengagement, responsive to pin-release drive means.

31. In a balance testing machine as set forth in claim 30, said lock drive means including,
a cam having travel between a pin-lock position and a pin-release position,
said lock drive means, imposing said urge upon said cam,
said cam transmitting said urge to said pin, and
said counterdrive means acting upon said cam to negate said urge,
and afford effect to said release drive means.

32. A balance testing machine as set forth in claim 31, said counterdrive means including,
an actuator having reciprocable travel between a position of releasable engagement with said cam to negate said urge, or a position of disengagement from said cam to yield to said urge, and
means adapting said cam for such engagement.

33. In a balance testing machine as set forth in claim 32,
said actuator extending into said first air passage at one limit of reciprocable travel, and extending through said aperture and into said chamber at the opposite limit of said travel,
whereby, at said opposite limit of travel respectively establish said valve in the open position, and to establish said cam in its release position.

34. In a balance testing machine as set forth in claim 33,
said actuator having an intermediate position in said reciprocable travel to yield to said lock drive means to establish said cam in a lock position, and retain said valve in an open but intermediate position for admission of air to inflate a tire on the carrier.

35. In a balance testing machine as set forth in claim 34,
said counterdrive means including,
a fluid motor to drive said actuator, said motor having,
a cylinder block mounted upon said base,
a driving piston disposed in said cylinder block to drive said actuator in said reciprocable travel,
said seating member and said carrier surmounting said cylinder block to dispose said first passage, said valve, said cam, and said hollow driven piston, in the path of travel of said actuator for actuation by said actuator.

36. In a balance testing machine as set forth in claim 35,
said driving piston having an intermediate position corresponding to the intermediate positions of said actuator, and said valve,
a stabilizing piston in said cylinder block independently actuable to stabilize said driving piston in said intermediate position.

37. In a balance testing machine as set forth in claim 36, said tire retention means including,
a carriage having travel to carry said upper rim element between a first position, seating said upper rim element upon said carrier to engage the upper bead of a tire loaded thereon, and a remote position withdrawn from said carrier to afford loading and unloading of a tire upon the carrier.

38. In a balance testing machine as set forth in claim 37,
means on said carriage to releasably engage said upper rim element for said travel, and
means on said upper rim element adapted for engagement by said means on said carriage.

39. In a balance testing machine as set forth in claim 38,
said means on said carriage being latch means carried by said carriage, and
said means on said upper rim element being a supplementary latch means for engagement by said first named latch means to carry said upper rim element with said carriage in said travel.

40. In a balance testing machine as set forth in claim 39,
means carried by said carriage to engage the side wall of a tire mounted on said carrier, to free the upper bead of such a tire from said upper rim element, upon travel of said carriage to said first position.

41. In a balance testing machine as set forth in claim 31,
said valve drive means being a yieldably resistant member disposed in said chamber to impel said valve to said closed position,
said lock drive means being a yieldably resistant member disposed to urge said cam to said pin-lock position.

42. In a balance testing machine as set forth in claim 41,
said chamber having a second wall,
a socket formed in said second wall exteriorly of said chamber,
a plunger guide hole formed in said second wall, and communicating between said socket and said chamber,
an elongated plunger extending through said plunger guide hole and into said socket,
said cam being disposed in said socket, and carried by said plunger, and
said plunger having reciprocable sliding travel in said plunger guide hole to carry said cam between said pin-lock position and said pin-release position.

43. In a balance testing machine as set forth in claim 42,
said yieldably resistant lock drive member being disposed to react between said second wall and said plunger to impel said plunger and said cam to said pin-lock position.

44. In a balance testing machine as set forth in claim 43,
said plunger being formed with a valve stem hole,
a valve stem extending rigidly from said valve disc and having sliding travel in said valve stem hole,
said yieldably resistant valve drive means being disposed to react between said second wall and said valve disc to impel said disc to said closed position.

45. In a balance testing machine as set forth in claim 44,
said plunger being circular in cross section,
said valve stem hole being substantially concentric with said plunger,
said plunger having one end extending into said chamber,
an annular flange formed on said one end,
said annular flange being substantially concentric with said valve disc,
said yieldably resistant lock drive means being a spring, reacting between said second wall and said annular flange,
said yieldably resistant valve drive means being a spring reacting between said second wall and said valve disc, and said yieldably resistant lock drive means being disposed concentrically with said yieldably resistant valve drive means.

46. In a balance testing machine as set forth in claim 45,
said elongated pin being actuable in reciprocable travel in a plane transverse to said vertical axis,
said cam engaging an end of said pin to drive said pin to said pin-lock position, and
said release drive means being a yieldably resistant means disposed in said carrier, and engageable with said pin to impel said pin to said pin-release position.

47. A balance testing machine as set forth in claim 1, said tire retention means including,
a lower rim element adapted to engage the lower bead of a tire loaded thereon,
an upper rim element removably receivable upon said carrier, and adapted to engage the upper bead of such a tire,
said upper rim element and lower rim element being adapted to retain a tire inflated thereon,
a locking mechanism associated with said carrier and having a locked position to secure said upper rim element on said carrier, and a release position to afford deposit upon or removal of said upper rim element from said carrier, and
lock drive means to urge said locking mechanism to said lock position,
counterdrive means actuable to negate said urge, and
release drive means to drive said mechanism to said release position when said counterdrive means negates said urge.

48. A balance testing machine as set forth in claim 47,
said locking mechanism employing at least one elongated pin actuable between a pin-lock position of engagement with said upper rim element, responsive to said lock drive means, and
a pin-release position of disengagement responsive to said release drive means.

49. In a balance testing machine as set forth in claim 48,
said lock drive means including,
a cam having travel between a pin-lock and a pin-release position,
said lock drive means imposing said urge upon said cam, said cam transmitting said urge to said pin, and
said counterdrive means acting upon said cam to negate said urge,
and afford effect to said release drive means.

50. In a balance testing machine as set forth in claim 49, said counterdrive means including,
an actuator having reciprocable travel between a position of releasable engagement with said cam to negate said urge, or a position of disengagement from said cam to yield to said urge,
said air conducting means including a valve having an open position and a closed position,
means interconnecting said valve and said cam to enable said actuator to concurrently move said valve to an open position and to move said cam to a release position.

51. In a balance testing machine as set forth in claim 1, said tire retention means including,
a lower rim element mounted on the carrier to receive the lowermost bead of a tire mounted on said carrier,
an upper rim element removably received upon said carrier and adapted to engage the upper bead of such a tire,
said upper rim element and lower rim element being adapted to retain air in a tire inflated thereon,
a carriage having travel to carry said upper rim element between a first position, seating said upper rim element upon said carrier to engage the upper bead of a tire loaded thereon, and a remote position withdrawn from said carrier to afford loading and unloading of a tire upon the carrier.

52. In a balance testing machine as set forth in claim 51,
means on said carriage to releasably engage said upper rim element for said travel, and
means on said upper rim element adapted for engagement by said means on said carriage.

53. In a balance testing machine as set forth in claim 52,
said means on said carriage being latch means carried by said carriage, and
said means on said upper rim element being a supplementary latch means for engagement by said first named latch means to carry said upper rim element with said carriage in said travel.

54. In a balance testing machine as set forth in claim 53,
means carried by said carriage to engage the side wall of a tire mounted on said carrier, to free the upper bead of such a tire from said upper rim element, upon travel of said carriage to said first position.

55. In a balance testing machine as set forth in claim 54,
a locking mechanism associated with said carrier and having a locked position to secure said upper rim element on said carrier, and a release position to afford deposit upon or removal of said upper rim element from said carrier, and
lock drive means to urge said locking mechanism to said lock position,
counterdrive means actuable to negate said urge, and
release drive means to drive said mechanism to said release position when said counterdrive means negates said urge.

56. In a balance testing machine as set forth in claim 55,
said locking mechanism employing at least one elongated pin actuable between a pin-lock position of engagement with said upper rim element, responsive to said lock drive means, and a pin-release position of disengagement, responsive to said release drive means.

57. In a balance testing machine as set forth in claim 56, said lock drive means including,
a cam having travel between a pin-lock position and a pin-release position,
said lock drive means imposing said urge upon said cam,
said cam transmitting said urge to said pin, and
said counterdrive means acting upon said cam to negate said urge,
and afford effect to said release drive means.

58. In a balance testing machine as set forth in claim 57, said counterdrive means including, an actuator having reciprocable travel between a position of engagement with said cam to negate said urge, or a position of disengagement from said cam to yield to said urge, and said means to resist escape of air including a valve having an open position and a closed position, means interconnecting said valve and said cam to enable said actuator to concurrently move said valve to an open position and to move said cam to a release position.

59. In a balance testing machine as set forth in claim 1, said tire retention means including, a lower rim element adapted to engage the lower bead of a tire loaded thereon, an upper rim element removably receivable upon said carrier, and adapted to engage the upper bead of such a tire, said upper rim element and lower rim element being adapted to retain a tire inflated thereon.

60. A balance testing machine as set forth in claim 59, a locking mechanism associated with said carrier and having a locked position to secure said upper rim element on said carrier, and a release position to afford deposit upon or removal of said upper rim element from said carrier, and lock drive means to urge said locking mechanism to said lock position, counterdrive means actuable to negate said urge, and release drive means to drive said mechanism to said release position when said counterdrive means negates said urge.

61. A balance testing machine as set forth in claim 60, said locking mechanism employing at least one elongated pin actuable between a pin-lock position of engagement with said upper rim element, responsive to said lock drive means, and a pin-release position of disengagement responsive to said release drive means.

62. In a balance testing machine as set forth in claim 61, said lock drive means including, a cam having travel between a pin-lock position and a pin-release position, said lock drive means imposing said urge upon said cam, said cam transmitting said urge to said pin, and said counterdrive means acting upon said cam to negate said urge, and afford effect to said release drive means.

63. In a balance testing machine as set forth in claim 62, said counterdrive means including, an actuator having reciprocable travel between a position of releasable engagement with said cam to negate said urge, or a position of disengagement from said cam to yield to said urge, said means to resist escape of air including a valve having an open position and a closed position.

means interconnecting said valve disc and said cam to enable said actuator to concurrently move said valve to an open position and to move said cam to a release position.

64. A balance testing machine for pneumatic tires, said machine including a base, a seating member mounted on said base and adapted to pivotally receive a carrier seated upon the seating member, and adapted for universal tilting travel relative to a substantially vertical axis, said carrier including, tire retention means to removably receive a tire for air-sealed retention on the carrier, said tire retention means including a lower rim element mounted on the carrier to receive the lowermost bead of a tire mounted on said carrier, an upper rim element removably received upon said carrier and adapted to engage the upper bead of such a tire, said upper rim element and lower rim element being adapted to retain air in a tire inflated thereon, a carriage having travel to carry said upper rim element between a first position seating said upper rim element upon said tire carrier to engage the upper bead of a tire loaded thereon, and a remote position withdrawn from said carrier to afford loading and unloading of a tire upon the carrier, and air conducting means to inflate and deflate a tire retained by said retention means.

65. In a balance testing machine as set forth in claim 64, means on said carriage to releasably engage said upper rim element for said travel, and means on said upper rim element adapted for engagement by said means on said carriage.

66. In a balance testing machine as set forth in claim 65, said means on said carriage being latch means carried by said carriage, and said means on said upper rim element being a supplementary latch means for engagement by said first named latch means to carry said upper rim element with said carriage in said travel.

67. In a balance testing machine as set forth in claim 66, means carried by said carriage to engage the side wall of a tire mounted on said carrier, to free the upper bead of such a tire from said upper rim element, upon travel of said carriage to said first position.

68. In a balance testing machine as set forth in claim 67, a locking mechanism associated with said carrier and having a locked position to secure said upper rim element on said carrier, and a release position to afford deposit upon or removal of said upper rim element from said carrier, and lock drive means to urge said locking mechanism to said lock position, counterdrive means actuable to negate said urge, and release drive means to drive said mechanism to said release position when said counterdrive means negates said urge.

69. In a balance testing machine as set forth in claim 68, said locking mechanism employing at least one elongated pin actuable between a pin-lock position of engagement with said upper rim element, responsive to said lock drive means, and a pin-release position of disengagement, responsive to said release drive means.

70. In a balance testing machine as set forth in claim 69, said lock drive means including, a cam having travel between a pin-lock position and a pin-release position, said lock drive means imposing said urge upon said cam, said cam transmitting said urge to said pin, said counterdrive means acting upon said cam to negate said urge, 71. In a balance testing machine as set forth in claim 70, said counterdrive means including,
an actuator having reciprocable travel between a position of releasable engagement with said cam to negate said urge, or a position of disengagement from said cam to yield to said urge,
said means to resist escape of air being a valve having an open position and a closed position,
means interconnecting said valve in said cam to enable said actuator to concurrently move said valve to an open position and to move said cam to a release position.

72. A balance testing machine for a pneumatic tire comprising a seating member and a carrier supported by the seating member in such a manner that the carrier may tilt with respect to the vertical axis,
said carrier including two elements being adapted to separate for loading of the tire and for air-sealed engagement with the tire when not separated, each element including a rim adapted to seal with one bead of the tire, and
means capable of operation in sequence
1. to lock the two elements of the carrier in air-sealed engagement with the tire and to permit inflation of the tire;
2. to maintain the inflation of the tire and to permit tilting of the carrier in response to any imbalance of the inflated tire; and
3. to permit deflation of the tire and to unlock the two elements of the carrier for separation.

73. The balance testing machine of claim 72 wherein the element of the carrier supported by the seating member carries, as part of said means, a pin lock mechanism to lock the two elements of the carrier in air-sealed engagement with the tire, an air passage connecting the interior of the tire with a second air passage in the seating member, and valve means to block said air passage.

74. The balance testing machine of claim 73 wherein said pin lock mechanism and said valve means are urged into locking and passage-closing positions respectively by spring means within the carrier, and said pin lock mechanism and valve means are mechanically interconnected so that said valve means opens the air passage before said pin lock mechanism unlocks the two elements.

75. The balance testing machine of claim 73 wherein the seating member includes as part of said means, an actuable means with three positions to operate the pin lock mechanism and the valve means.

76. The balance testing machine of claim 75 wherein the actuable means includes a piston-like member driven to three positions along a vertical axis by a fluid motor beneath said seating member, said valve means includes a valve disc covering an opening in the air passage connected with the second air passage, said piston-like member at its upper end bearing against the valve disc and holding said valve open in its uppermost two positions to permit inflation of the tire, said piston-like member in its lowermost two positions permitting the pin lock mechanism to lock the elements of the carrier into engagement and in its lowermost position freeing said carrier element from contact with the seating member that interferes with tilting in response to tire imbalance.

77. The balance testing machine of claim 72 wherein the element of the carrier supported by the seating member carries as part of said means, an air passage connected with the interior of the tire and valve means to close the air passage, the seating member includes as part of said means, movable air passage-forming means connectable to a source of compressed air and an actuable means for said valve means and for said movable air passage-forming means, said movable air passage-forming means including a seal to seal against a surface of said carrier element surrounding the air passage and being thus connectable with the air passage of the carrier, said actuable means opening said valve means and permitting said movable air passage-forming means to seal against the surface of the carrier element and form an air passage through the seating member into the tire in one position and permitting said valve to close and disconnecting said movable air passage-forming means from said carrier element in a second position so that the tire carrier may be free to tilt in response to any imbalance in the inflated tire.

78. The balance testing machine of claim 77 wherein the actuable means includes a piston-like member driven to two positions along a vertical axis, said piston-like member being mechanically interconnected with the movable air passage-forming means and in one position disengaging the mechanical interconnection with the movable air passage-forming means thereby permitting spring means to move the movable air passage-forming means into said sealing engagement with the carrier element and operating the valve means to open the air passage formed thereby, and in the second position engaging the mechanical interconnection with the movable air passage-forming means and thereby disconnecting the movable air passage-forming means from the carrier element and permitting the valve means to close.

79. The balance testing machine of claim 77 wherein the element of the carrier supported by the seating member carries as part of said means, a pin lock mechanism and drive lock means to lock the two elements of the carrier in air-sealed engagement with the tire when said actuable means is in said one position and said second position, and wherein said actuable means has a third position, disengaging the drive lock means from the pin lock mechanism to unlock the two elements of the carrier and permit removal of the tire.

* * * * *